United States Patent
Boyes

[11] Patent Number: 5,841,211
[45] Date of Patent: Nov. 24, 1998

[54] SUPERCONDUCTING GENERATOR AND SYSTEM THEREFOR

[76] Inventor: Thomas G. Boyes, 4772 Big Draw Dr., Las Vegas, Nev. 89031

[21] Appl. No.: 709,511

[22] Filed: Sep. 6, 1996

Related U.S. Application Data

[63] Continuation-in-part of Ser. No. 275,365, Jul. 15, 1994, abandoned, and Ser. No. 365,703, Dec. 29, 1994, abandoned.

[51] Int. Cl.$^6$ ................................................ H02K 9/00
[52] U.S. Cl. ........................... 310/90; 310/74; 310/90.5
[58] Field of Search ........................ 310/90, 90.5, 74; 505/1, 700

[56] References Cited

U.S. PATENT DOCUMENTS

| | | | |
|---|---|---|---|
| 3,766,456 | 10/1973 | Carow | 318/138 |
| 3,940,643 | 2/1976 | Sika et al. | 310/10 |
| 4,031,421 | 6/1977 | Gieger | 310/112 |
| 4,306,419 | 12/1981 | Schwartz | 62/6 |
| 4,307,310 | 12/1981 | Wedman et al. | 310/177 |
| 4,398,108 | 8/1983 | Danilevich et al. | 310/54 |
| 4,537,033 | 8/1985 | Kamil | 62/3 |
| 4,588,040 | 5/1986 | Albright, Jr. et al. | 180/65 |
| 4,836,755 | 6/1989 | Nitsche et al. | 417/368 |
| 4,893,103 | 1/1990 | Leupold | 335/216 |
| 4,908,347 | 3/1990 | Denk | 505/1 |
| 4,939,120 | 7/1990 | Moon et al. | 505/1 |
| 5,032,748 | 7/1991 | Sakuraba et al. | 310/52 |
| 5,066,638 | 11/1991 | Lloyd et al. | 505/1 |
| 5,167,167 | 12/1992 | Tiernan, Jr. et al. | 74/573 R |
| 5,168,202 | 12/1992 | Bradshaw et al. | 318/605 |
| 5,177,054 | 1/1993 | Lloyd et al. | 505/1 |
| 5,214,981 | 6/1993 | Weinberger et al. | 74/573 R |
| 5,220,232 | 6/1993 | Rigney, II et al. | 310/90.5 |
| 5,243,279 | 9/1993 | Bajat et al. | 324/207.21 |
| 5,256,924 | 10/1993 | Fischer | 310/233 |
| 5,277,661 | 1/1994 | Mak et al. | 464/182 |
| 5,325,002 | 6/1994 | Rabinowitz et al. | 505/166 |
| 5,331,819 | 7/1994 | Matsuda et al. | 62/51.1 |
| 5,341,059 | 8/1994 | Fukuyama et al. | 310/90.5 |
| 5,350,958 | 9/1994 | Ohnishi | 310/52 |
| 5,430,009 | 7/1995 | Wang | 505/166 |
| 5,446,018 | 8/1995 | Takahata et al. | 310/90.5 |
| 5,482,919 | 1/1996 | Joshi | 310/52 |

*Primary Examiner*—Nestor Ramirez
*Assistant Examiner*—Elvin G. Enad
*Attorney, Agent, or Firm*—Quirk & Tratos

[57] ABSTRACT

A superconductive generator and system incorporating the same is set forth which includes Meissner Effect bearings for the armature, type II superconductor filament rods for permanent magnets of the stator and an asymmetric flywheel rotating mass contained in a cryogenic, evacuated housing to provide an efficient source of a-c power. The system incorporating the generator includes a supercapacitor including superconductive plates maintained at or below the superconductive critical temperature which act to store energy generated by the superconductive generator. Power drawn from the superconductive generator and supercapacitor provides a source of power for motive means such as electric motors and machinery.

9 Claims, 6 Drawing Sheets

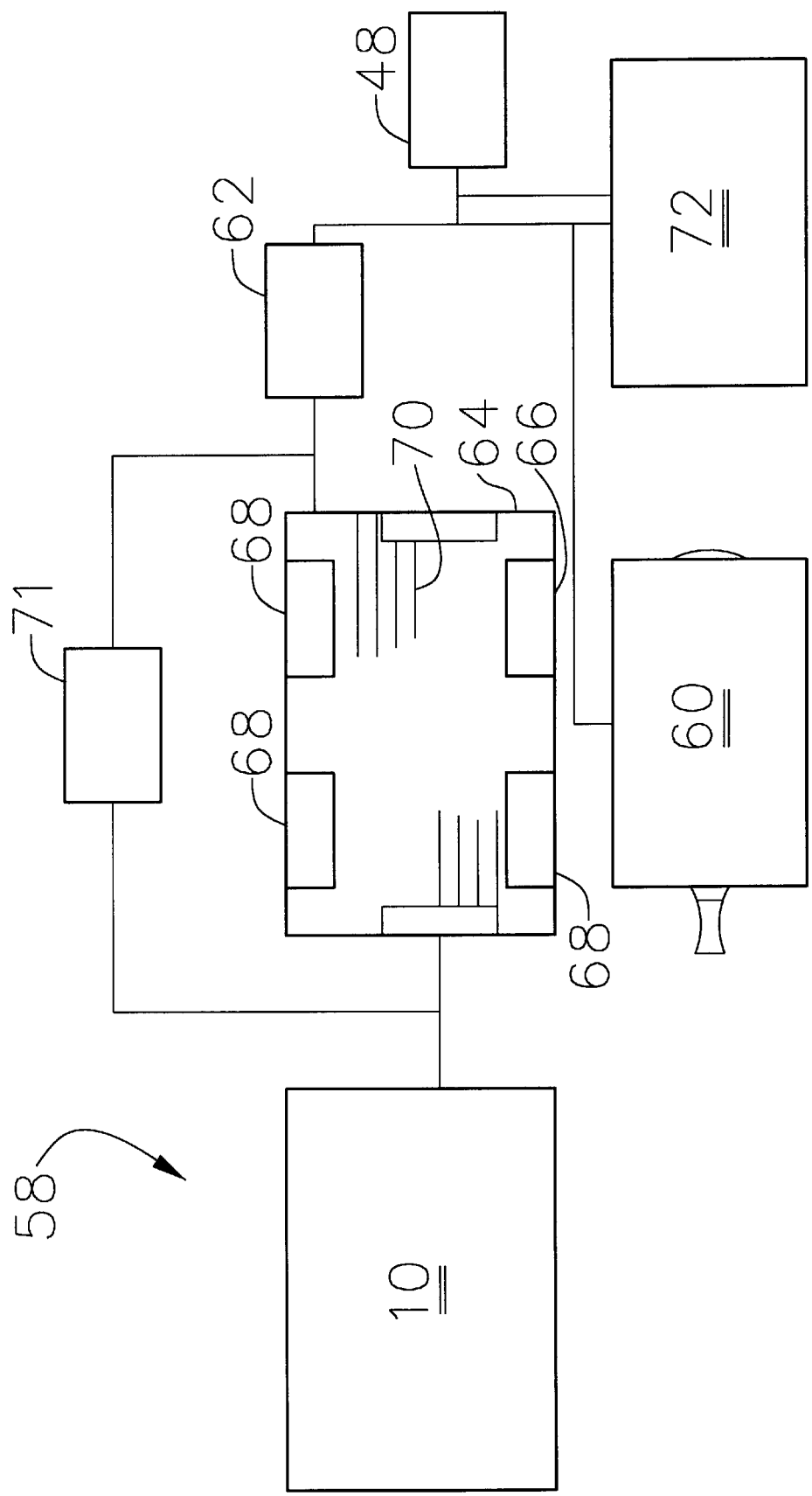

SUPERCONDUCTING GENERATOR AND SYSTEM THEREFOR

CROSS REFERENCE TO RELATED APPLICATIONS

This application is a continuation-in-part of application Ser. No. 08/275,365, filed Jul. 15, 1994 now abandoned, and entitled "Superconducting Electric Automobile Motor" and application Ser. No. 08/365,703, filed Dec. 29, 1994 now abandoned, and entitled "Superconducting Kinetic Generator".

FIELD OF THE INVENTION

The present invention relates to superconducting generators and systems for providing motive force therefrom.

BACKGROUND OF THE INVENTION

Superconducting generators are generally known as described in Matsuda et al, U.S. Pat. No. 5,331,819, Lloyd et al, U.S. Pat. No. 5,177,054 and Sakuraba et al, U.S. Pat. No. 5,032,748. Matsuda et al disclose a superconducting rotating apparatus which has a rotor disposed on a shaft, the ends of which are levitated by use of superconductive diamagnetic material and relying upon the Meissner Effect. Rigney, II et al, U.S. Pat. No. 5,220,232, discloses the Meissner Effect levitation bearings using $YBa_2Cu_3O_x$, a Type II superconductor. When cooled to a critical temperature, the Meissner Effect is produced which results in levitational support for the rotor shaft.

While the use of levitational bearings can reduce losses due to friction and therefor increase the efficiency of a generator, losses occur due to the aero-dynamic drag losses of the rotor as well as from electrical connections such as brushes with the rotor. These losses, as well as any magnetically induced losses, require frequent input of external rotational impetus to the rotor to maintain rotation of the generator's armature and maintain efficient power generation. There is a need to decrease the effects of these losses on the generator and to thus increase a superconducting generator's overall efficiency.

Further, there is a need to increase the magnetic field presented by the generator's stator. A focused magnetic field, using the principle of flux pinning, increases the power generated by the generator.

There is also a need to provide a system for producing motive force using a superconductive generator. While it is known to supply the electrical power generated by the generator to an electric motor, there is a need to provide a system which provides an efficient capacitance for the supply of power to maintain a uniform, efficient source of power for the motor.

SUMMARY OF THE INVENTION

There is, therefor, provided according to the present invention a superconductive generator which increases the overall efficiency of the generation of power. There is also provided a system incorporating a superconductive generator and supercapacitor which is adapted to efficiently provide power to a motor for the supply of motive force.

Accordingly, a superconductive generator is provided which includes a shaft and an armature mounted on the shaft for rotation therewith. The armature, in a known fashion, has windings of a suitable material. A stator, including a plurality of rare earth permanent magnets stacked in alternating polarity with intervening Type II superconducting filament rods, is provided. The rods, in combination with the permanent magnets, are adapted to induce flux pinning to produce an efficient magnetic field presented by the stator. The armature and stator are enclosed in a cyrogenic housing which is maintained by suitable means at or below the critical temperature $T_c$. Superconducting bearing means, within the housing, act to levitate the shaft relative to the housing to minimize bearing friction losses for the generator.

Disposed on the shaft within the housing is an asymmetric flywheel proving a rotating mass which, through the momentum produced thereby, tends to maintain the shaft and thus the armature in rotation and minimize the proportional effects of any drag or frictional losses imposed upon the rotating components. To initiate rotation of the shaft, means are provided for imparting rotation and for, on demand, imputing rotation to maintain a selected, efficient rotational speed for the armature.

The combination of the levitation bearings, flux pinning of the magnetic field produced by the stator magnets and the rotating mass provided by the asymmetric flywheel contribute to the overall efficiency of power generation by the generator.

The system for providing the motive force includes a generator of the type described above and a DC electric motor having a power output shaft to provide motive force. A supercapacitor is maintained at or below the critical temperature $T_c$ to store excess energy produced by the generator and means are provided for converting the a-c output from the generator and supercapacitor into d-c current for supply to the d-c electric motor. Battery storage means as well as means for controlling the supply of the output of the generator and that drawn from the superconductor are provided to further store excess energy, provide an energy reserve and provide for the efficient supply of power to the motor.

BRIEF DESCRIPTION OF THE DRAWINGS

These, and other features and advantages will become appreciated as the same becomes better understood with reference to the specification claims and drawings wherein:

FIG. 6 is a schematic view of the system for providing motive force using the superconducting generator according to the present invention.

DESCRIPTION

Figure 1:
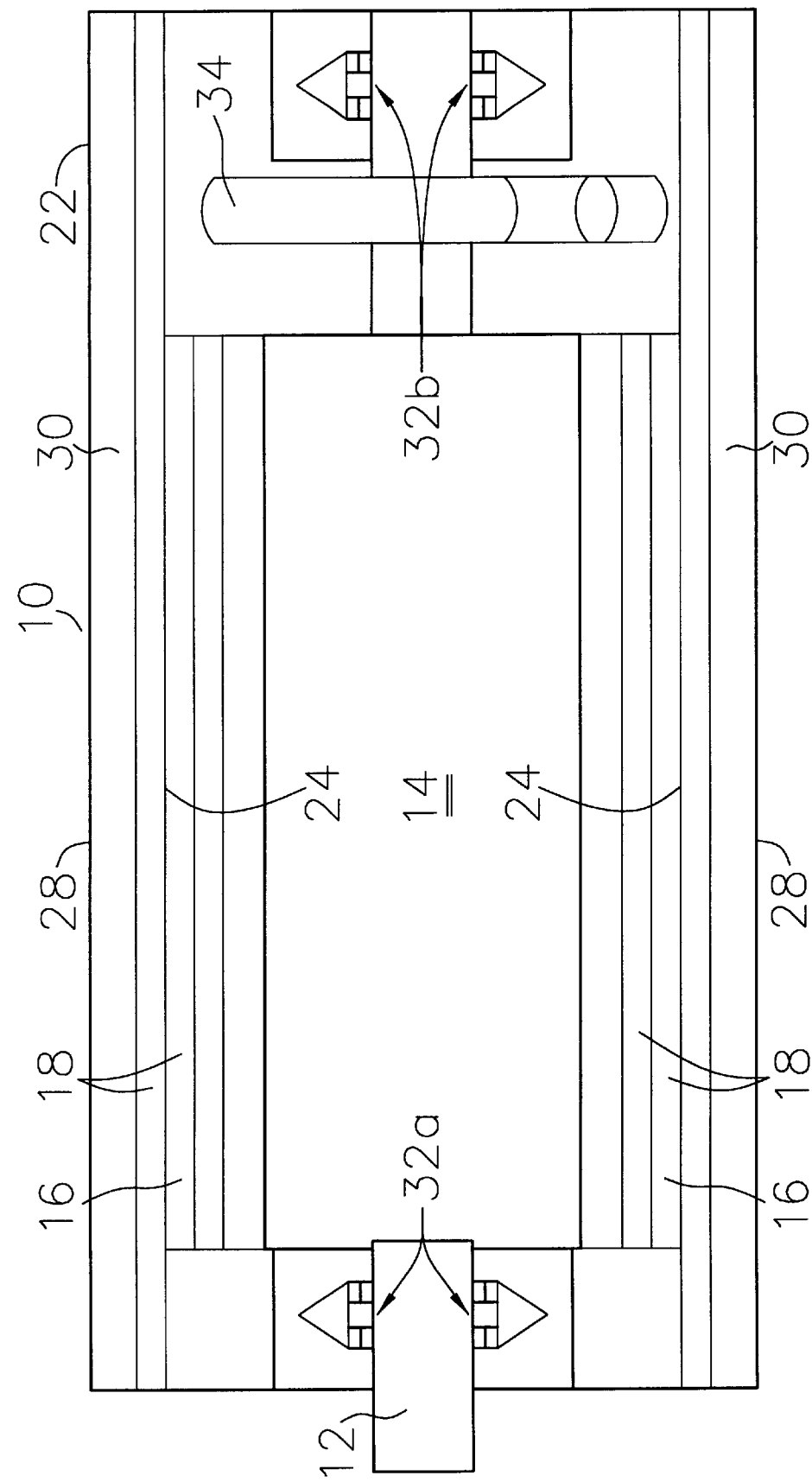
FIG. 1 is schematic view of a super conducting generator according to the present invention.

Turning to the drawings, FIG. 1 shows generally certain components of the superconducting generator 10 according to the present invention. The generator 10 has a shaft 12, which, for weight and strength considerations, is preferably fashioned from titanium. A rotor or armature 14 is disposed on the shaft 12 for rotation therewith in a known manner. The armature 14 is also preferably constructed from titanium and is wound with 0.5 inch electrolytic processed copper wire in a configuration also well known to those skill in the art.

Figure 2:
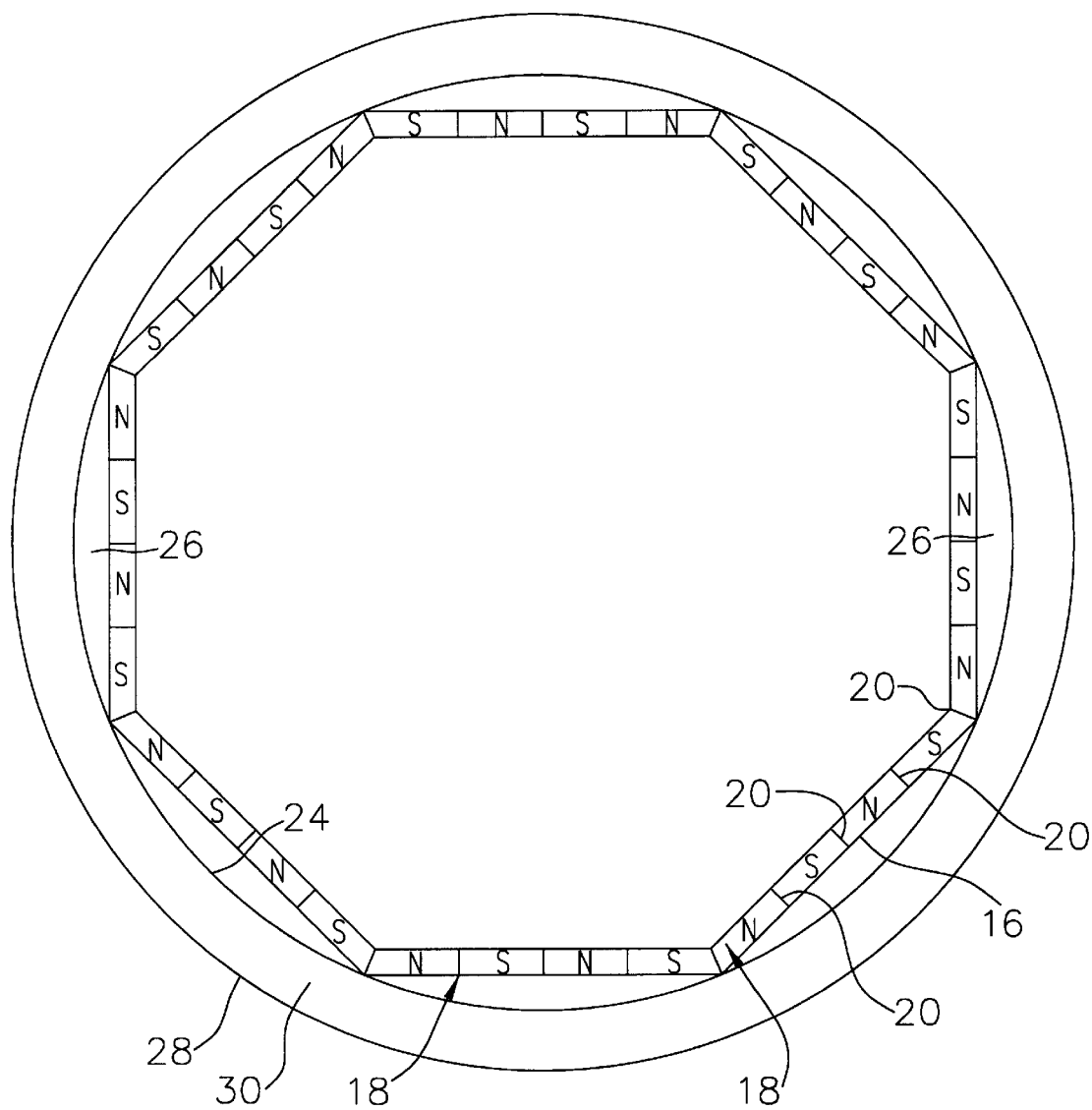
FIG. 2 is schematic cross-section view of the stator and housing for the superconducting generator.

To cooperate with the armature 14, the generator 10 also includes a fixed stator 16 as best shown in FIGS. 1 and 2. The stator 16 includes a plurality of rare earth permanent magnets 18 preferably fashioned from samarium-cobalt. These permanent magnets 18 are disposed to encircle the armature 14 and are arranged in alternating polarities as best shown in FIG. 2. Disposed between each row of the stator magnets 18 are filament rods 20 preferably constructed from a Type II superconducting material such as $YBa_2Cu_3O_x$. The filament rods 20 cooperate with the magnets 18 to, through the phenomenon of flux pinning, produce efficient flux lines produced by the stator 16, the flux lines of which are passed through by the windings of the armature 14 to generate a-c current.

With continued reference to FIGS. 1 and 2, the armature 14 and stator 16 are disposed in an evacuated, cryogenic housing 22. The housing has an inner casing 24 which may be fashioned from aluminum and which acts to support the magnets 18 and filament rods 20. As shown in FIG. 2, the magnets 18 and filament rods 20 are arranged in an octagonal pattern within the inner casing 24 defining chambers 26 through which are disposed conduits (not shown) for circulation of cryogenic fluid. Spaced radially from the inner casing 24 is an outer casing 28 which may be constructed from Kevlar® (a registered trademark of DuPont) which may in turn, have a reflective outside surface to reduce the input of ambient radiant heat to the generator 10. The space between the inner casing 24 and outer casing 28 is filed with an insulation 30 which may be fiberglass or the like. Due to the extremely low temperatures to be maintained in the generator to produce the superconducting effects, multiple layers of insulation may be provided. Further, while FIG. 2 illustrates the relationship between the inner casing 24 and outer casing 28, it is to be understood that the degree of insulation to be provided and the layers of insulation is not to be limited by the depiction herein.

In a known fashion, the housing 22 within the inner casing 24 is evacuated to a vacuum which may be at or greater than 0.85 psia. The evacuation of the housing reduces any aerodynamic drag which may be imposed upon the rotating armature 14 within the generator 10.

The stator 16 and armature 14 are maintained at or below the critical temperature $T_c$ at which superconducting effects occur. Preferably $T_c$ is at or less than 77 degress Kelvin. At these temperatures, the flux pinning of the stator magnets 18, induced by the filament rods 20, occurs and at the same time, the resistance to the flow of current in the armature windings is reduced. These features combine to enable the generator 10 to efficiently generate power.

To contribute to the efficiency of the generator 10, the shaft 12, at each end thereof, is supported by superconducting bearings 32a,b. The bearings are of the type described in Rigney, II et al., U.S. Pat. No. 5,220,232 issued to Allied Signal Aerospace, the disclosure of which is hereby incorporated by reference. The bearings 32a,b are maintained at the temperature for inducement of the levitational effects by inclusion of the bearings 32a,b within the cryogenic environment of the housing 22. By providing levitation support for the rotation of the shaft 12, bearing losses for the generator 10 are reduced to further increase the efficiency of the generation of power.

Figure 3:
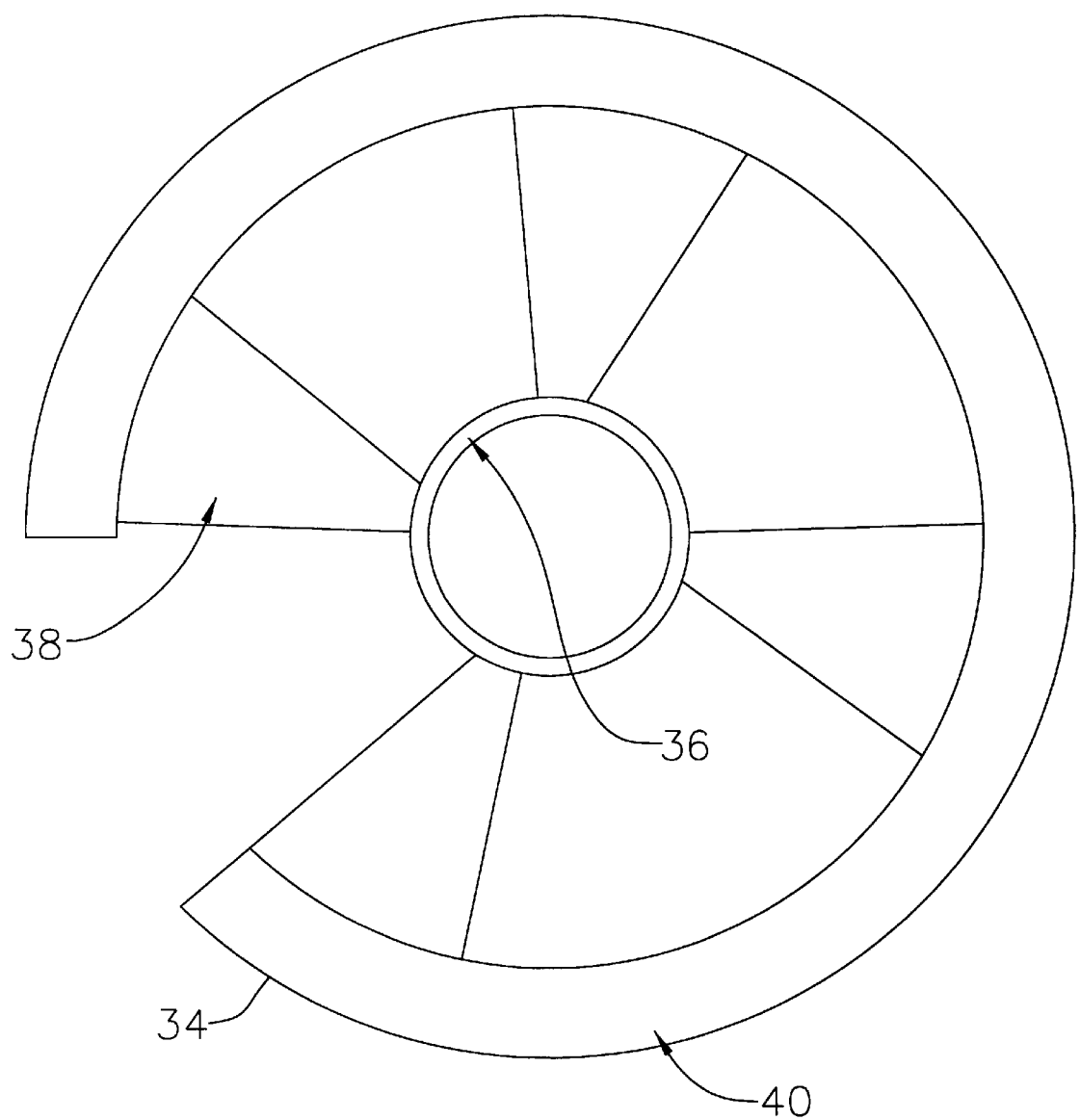
FIG. 3 is an end view of the asymmetric flywheel for the superconducting generator.

To maintain rotation of the shaft 12 and armature 14, the generator 10 also includes, within the housing 22, a mass secured to the shaft 12 embodied as an asymmetric flywheel 34. With reference to FIGS. 1 and 3, the flywheel includes a hub 36 adapted to be mounting on the shaft 12. Radiating from the hub 36 are spokes 38 which in turn support an asymmetric and massive rim 40. As best shown in FIG. 3, the rim 40 extends about the circumference of the hub 36 approximately 300 degress. It has been found that the asymmetry of the rim 40 contributes to the efficiency of the rotation of the flywheel 34 and, by virtue of its connection to the shaft, the armature 14. This efficiency may be caused by internal stresses of the flywheel induced by changes in acceleration which are released in a fashion to "pump" the rotation of the flywheel 34 to attempt to maintain a constant rotation of velocity. Preferably, the flywheel 34 is fashioned from cast or molded molybdenum.

To reduce any aerodynamic drag, the flywheel 34 is disposed on the shaft 12 with in the cryogenic, evacuated environment as shown in FIG. 1.

Figure 4:
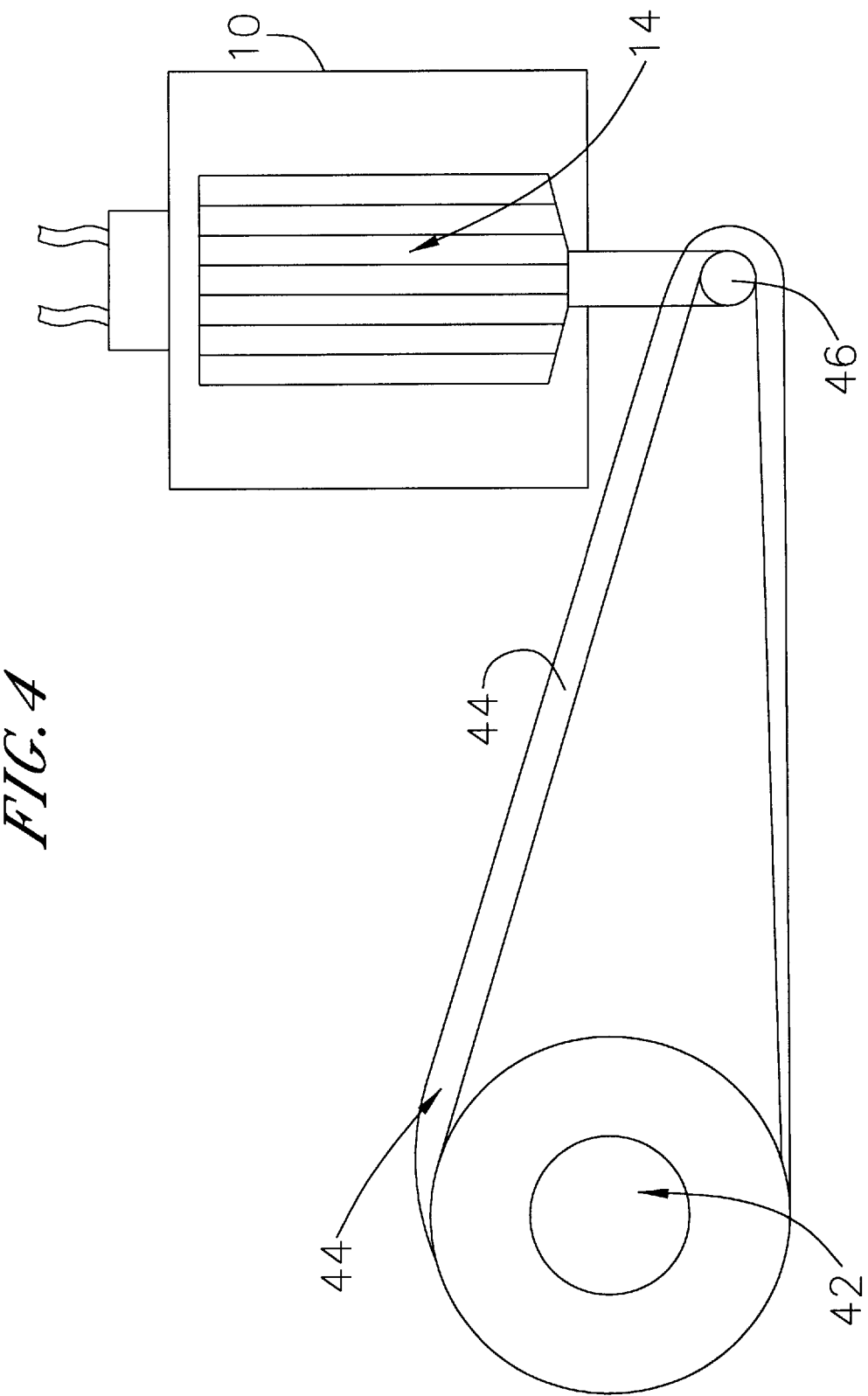
FIG. 4 is a schematic view of a portion of the system, according to the present invention, for initiating and maintaining rotation of the armature for the superconductor.

With reference to FIG. 4, to induce initial rotation of the shaft 12 and its armature 14, an electric motor 42 is provided and is coupled to the shaft by suitable means shown in FIG. 4 as a belt drive 44. Through a suitable transmitting device, which may be a clutch or magnetic coupling shown generally as transmission 46, the motor 42 is adapted to induce initial rotation to the shaft 12 and to, when required, input rotation to maintain the revolutions of the shaft 12 for the efficient generation of power.

Figure 5:
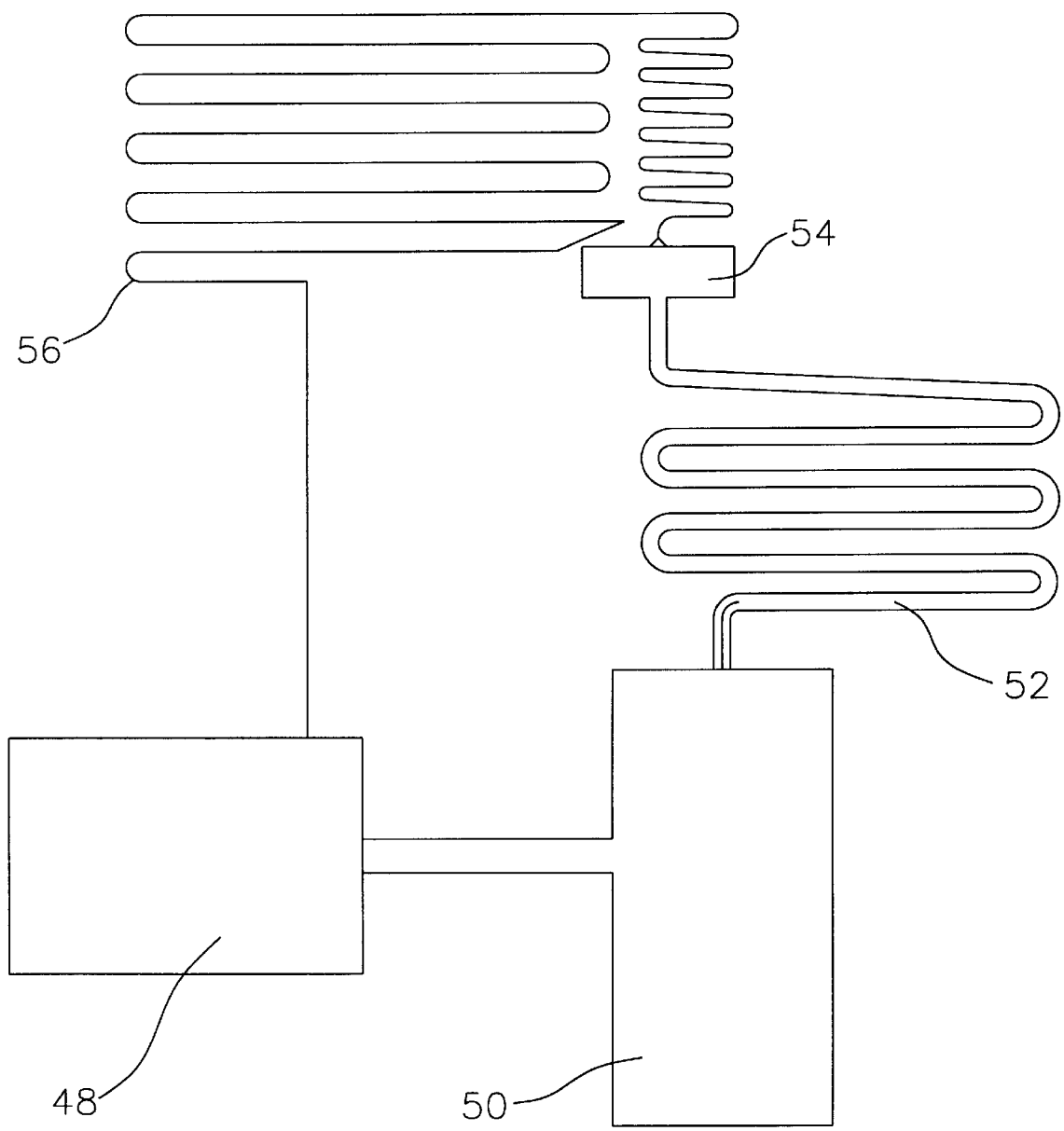
FIG. 5 is a schematic view of the cryogenic system for maintaining the critical temperature $T_c$.

Turning to FIG. 5, to induce and maintain the critical temperature $T_c$, refrigeration means are provided. As illustrated, the refrigeration means includes a compressor 48 which liquifies nitrogen and delivers it to a receiver 50. A conduit 52 delivers the liquid nitrogen to a refrigeration control and expansion valve 54, which in turn delivers the cryogenic nitrogen to the pipes 56 disposed within the housing 22 of the generator 10. Thermal energy, within the housing, is transferred to the nitrogen within the pipes 56 which carries the heat back to the compressor 48 for recirculation. In this fashion, the circulation of liquid nitrogen and the expansion thereof produces the critical temperature $T_c$ and maintains the same at or below the preferred 77 degrees Kelvin.

Turning to FIG. 6, the system incorporating the generator 10, according to the present invention and for providing motive force, will now be described. The system, shown generally as system 58, includes the generator 10 of the type described above. The means for maintaining the cryogenic, evacuated environment, as well as the means for initiating rotation of the shaft 12, are not depicted.

The system 58 includes a d-c motor 60 of conventional design. The motor 60 has an output shaft to provide motive force such as to power machinery, vehicles and the like. Accordingly, it is to be understood that the system 58 could be adapted to power a vehicle. The a-c output of the generator 10 is supplied to the motor 60 and for this purpose, the system 58 includes a commutator 62 to convert the a-c current produced by the generator 10 to d-c current to supply to the motor 60. Interposed between the generator 10 and commuter 62 is a supercapacitor 64. The supercapacitor 64 includes a cryogenic container 66, the interior of which is maintained at or below $T_c$. Within the container 66 are Type II superconductor plates 68 of $YBa_2Cu_3O_x$. Plates 68, powered from the output of the generator 10, provide a-c current to the supercapacitor 64. These plates maybe constructed from Alnico or other suitable materials. The energy supplied to the supercapacitor 64 in the form of an a-c current produce, by the plates 68 is stored as electric potential in the superconductor plates 68. Copper conductors 70 draw, on demand from the electric potential stored in the plates 68, an a-c output from the supercapacitor 64 for supply to the commuter 62.

To maintain the supercapacitor 64 at $T_c$, the refrigeration means of the type described above, as well as the insulation and outer casing, may be provided.

A regulator 71 balances the supply of power from the generator 10 and supercapacitor 64 to the commuter 62 for supply to the motor 60. Thus, in periods of little or no demand, power may be stored in the supercapacitor 64. In peak demands, any deficiency in power supplied by the generator 10 may be made up by drawing power from the supercapacitor 64.

The system 58 also includes storage means shown graphically as a battery 72. Thus, excess energy produced by the generator 10 may also be stored by suitable means at the battery 72.

As also shown, the system 58 may be drawn upon to supply power to the compressor 48 of the refrigeration means. Thus, when little or no power is required by the motor 60, at least a portion of the power requirements of the refrigeration compressor 48 may be supplied by the generator 10, supercapacitor 64 and/or battery 72. Also, while not shown in FIG. 6, the power generated by the generator 10 and stored at the supercapacitor 64 and/or battery 72, may be supplied to the motor 42 to maintain revolutions of the generator shaft 12.

The generator 10, according to the present invention, provides an efficient source of a-c power. The components of the superconducting levitation bearings 32a,b, the flux pinning offered by the cooperation between the magnets 18 and filaments 20 and the rotating mass provided by the asymmetric flywheel 34, contribute to the overall efficiency. Furthermore, the system 58, according to the present invention, incorporating the generator 10 includes a supercapacitor 64 which, in combination with the other components of the system 58, cooperates to provide an efficient, reliable source for motive means such as a motor or other machinery.

While I have shown and described certain embodiments of the present invention, it is to be understood that it is subject to modifications without departing from the scope of the appended claims.

I claim:

1. A superconducting generator comprising:
   (i) a shaft;
   (ii) an armature mounted on the shaft for rotation therewith;
   (iii) a stator including a plurality of rare earth permanent magnets stacked in alternating polarity with intervening Type II superconducting filament rods;
   (iv) a cryogenic housing for the armature and stator;
   (v) superconducting bearing means to levitate the shaft for rotation;
   (vi) means for maintaining said housing at substantially a critical temperature $T_C$;
   (vii) an asymmetric flywheel coupled to the shaft to maintain rotation of the shaft;
   (viii) means for imparting rotation to the shaft; and
   (ix) an evacuated cryogenic housing enclosing the armature, stator, superconducting bearing means and flywheel, said superconducting bearing means adapted to journal and levitate the shaft for rotation within the housing.

2. The generator of claim 1 wherein said permanent magnets are samarium-cobalt.

3. The generator of claim 2 wherein the filament rods are yttrium barium copper oxide.

4. The generator of claim 1 wherein the housing is maintained at a vacuum.

5. The generator of claim 4 wherein the housing is maintained at approximately 0.85 psia.

6. The generator of claim 1 wherein the flywheel includes a hub, three supporting spoke members and a weighted rim asymmetrically extending about the circumference of the flywheel approximately 300 degrees.

7. The generator of claim 1 wherein the temperature maintaining means maintains the temperature within the housing to approximately a $T_C$ of 77 degrees Kelvin.

8. A superconducting generator comprising:
   (i) a shaft;
   (ii) an armature mounted on the shaft for rotation therewith;
   (iii) a stator including a plurality of rare earth permanent magnets extending longitudinally along the stator and circumferentially stacked in alternating polarity with longitudinally extending and intervening Type II superconducting filament rods;
   (iv) a cryogenic housing for the armature and stator;
   (v) superconducting bearing means within the housing to levitate the shaft for rotation within the housing;
   (vi) means for maintaining said housing at substantially a critical temperature of 77 degrees Kelvin;
   (vii) an asymmetric flywheel within the housing coupled to the shaft to maintain rotation of the shaft, the flywheel having a weighted rim asymmetrically extending about the circumference of the flywheel approximately 300 degrees; and
   (viii) means for imparting rotation to the shaft.

9. A system for providing motive force including a superconducting generator comprising:
   (i) a superconducting a-c generator including,
      (a) a shaft,
      (b) an armature mounted on the shaft for rotation therewith,
      (c) a stator including a plurality of rare earth permanent magnets extending longitudinally along the stator and circumferentially stacked in alternating polarity with longitudinally extending and intervening Type II superconducting filament rods;
      (d) a cryogenic housing for the armature and stator,
      (e) superconducting bearing means within the housing to levitate the shaft for rotation within the housing,
      (f) means for maintaining said housing at substantially a critical temperature $T_C$,
      (g) an asymmetric flywheel within the housing coupled to the shaft to maintain rotation of the shaft; and
      (h) means for imparting rotation to the shaft,
   (ii) a d-c electric motor having a power output shaft to provide motive force;
   (iii) means for converting the a-c output of the generator to d-c;
   (iv) a supercapacitor within the housing to store potential of the generator produced in excess of the demand of the motor; and
   (v) means for controlling the supply of the output of the generator and current drawn from the supercapacitor to the motor.

\* \* \* \* \*